Dec. 19, 1950  KUAN-HAN SUN  2,534,932
METHOD OF DETECTING ELEMENTARY PARTICLES
Filed June 19, 1947

WITNESSES:
Robert C. Baird

INVENTOR
Kuan-Han Sun.
BY
Hymen Diamond.
ATTORNEY

Patented Dec. 19, 1950

2,534,932

UNITED STATES PATENT OFFICE 2,534,932

METHOD OF DETECTING ELEMENTARY PARTICLES

Kuan-Han Sun, Pittsburgh, Pa., assignor to Westinghouse Electric Corporation, East Pittsburgh, Pa., a corporation of Pennsylvania Application June 19, 1947, Serial No. 755,636

2 Claims. (Cl. 250—83.6)

My invention relates to the detection of elementary particles, and it has particular relation to the detection of elementary particles of the neutron type.

By "elementary particles," I mean atomic or nuclear particles, such as neutrons, neutral mesons, protons, alpha particles, positrons, electrons, gamma rays and photons. By "elementary particles of the neutron type," I mean atomic or nuclear particles, such as neutrons which do not produce scintillations when they impinge on a fluorescent body such as a screen of zinc sulphide, zinc cadmium sulphide or calcium tungstate. By "elementary particles of the proton type," I mean particles which do produce visible scintillations when they impinge on a fluorescent body.

My invention relates to the application to John W. Coltman and Fitz-Hugh B. Marshall, Serial No. 752,942, filed June 6, 1947. The Coltman and Marshall application discloses a system for detecting scintillations produced by elementary particles. This system is particularly effective in detecting particles incident at a high rate and also particles which produce scintillations of low intensity. It is, however, useful only in the detection of elementary particles of the proton type. Elementary particles of the neutron type, impinging on the fluorescent body disclosed by Coltman and Marshall would fail to produce scintillations and would not be detected.

It is, accordingly, an object of my invention to provide apparatus for counting elementary particles of the neutron type.

Another object of my invention is to provide a method for counting elementary particles of the neutron type.

A further object of my invention is to provide apparatus and a method for counting scintillations produced by elementary particles of the neutron type incident at a high rate.

A still further object of my invention is to provide apparatus and a method for detecting elementary particles of the neutron type incident at a low number rate.

An ancillary object of my invention is to provide a novel fluorescent material.

Another ancillary object of my invention is to provide a Geiger counter particularly suitable for the detection of particles of the neutron type.

Still another ancillary object of my invention is to provide a Geiger counter which shall operate with high efficiency to detect elementary particles of the neutron type.

A further ancillary object of my invention is to provide apparatus for efficiently detecting elementary particles.

In accordance with my invention, I provide a fluorescent material which has mixed therein, chemically compounded therewith or has disposed adjacent thereto, a material which emits elementary particles of the proton type when elementary particles of the neutron type impinge thereon. For example, the fluorescent material in accordance with my invention may be composed of a mixture of a phosphor, such as zinc sulphide, or calcium tungstate and a material such as boron or its compound, or gadolinium or its compounds, which emits elementary particles of the proton type when elementary particles of the neutron type impinge thereon. Neutron reactive fluorescent materials, such as zinc borate ($ZnB_2O_4$), cadmium borate ($CdB_2O_4$) or other borates are also within the scope of my invention.

A body of such reactive fluorescent materials is in accordance with my invention positioned in the region where the elementary particles of the neutron type are to be detected. When these particles impinge on the body, elementary particles of the proton type are emitted by the boron or other reactive substance included in it. The elementary particles of the proton type cause the body to scintillate and the resultant scintillations are gathered and projected onto the collecting electrode of a photo-multiplier. The output of the photo-multiplier is connected to circuits in the same manner as in the Coltman and Marshall system.

An aspect of my invention arises from the realization that the reactive fluorescent body should be compact and, therefore, should be solid or liquid rather than gaseous. To illustrate this thesis, let us assume, for example, that the neutron reactive element which "converts" elementary particles of the neutron type into elementary particles of the proton type, is the typical element $B^{10}$, that is, boron having an atomic weight 10. If this reactive element were in gaseous form, a gas including the element, for example, boron fluoride ($BF_3$) would be included in an ionization chamber adjacent the phosphor. Let $t_0$ be the thickness of a layer of gas which would be required to absorb every neutron impinging on the gas. $t_0$ is a measure of the diameter of the gas counter of the prior art. The theoretical value of $t_0$ may be determined from the equation $$t_0 = \frac{W}{\sigma f d N}$$

in which, $\sigma$=capture cross-section for neutrons of the absorbing substance
$f$=weight fraction of absorbing substance in absorber
$W$=atomic weight of absorbing substance
$N$=Avogadro's number
$d$=density or apparent density of absorbing substance For $BF_3$, $\sigma$=740 barns
$f$=0.16
$d$=0.00282 gram per cubic centimeter
$t_0$=5.4 centimeters The above calculation is theoretical and yields a value of the thickness of absorber which is lower than the required value. In actual fact, the absorber should have a thickness of the order of seven centimeters, that is, approximately 3 inches or even thicker. A 3-inch body is excessively large for convenient application.

Let us now assume that a solid detecting material such as boron oxide ($B_2O_3$) is utilized. Let us also assume that a fluorescent body is composed of 50 per cent boron oxide and 50 per cent phosphor (such as zinc sulphide). Under such circumstances, $f$=0.155 and
$d$=1.5 grams per centimeter cubed.

Now, $t_0$=0.012 centimeter.

Accordingly, a very thin layer of solid detecting material is required to absorb every elementary particle of the neutron type. A body having a thickness of from one to five millimeters serves satisfactorily as reactive fluorescent body. With a small body of this type disposed so as to receive elementary particles of the neutron type and with efficient gathering means for the resulting scintillations, the incidence of such particles may be counted even if it is at a high rate with apparatus in accordance with my invention. With the same apparatus elementary particles of the neutron type having low energy content may be detected.

Based on the concept illustrated by the above calculations, I provide, in accordance with another aspect of my invention, a "Geiger" counter in which a thin layer of reactive fluorescent material (for example, a mixture of zinc sulphide and boric acid ($H_3BO_3$)) and a photo-sensitive material are interposed between the ionizable medium and the source of radiation. Such a "Geiger" counter may be small since it does not require a deep layer of gas. The particles of the neutron type are now completely absorbed and converted into scintillations by the reactive fluorescent layer. The photo-sensitive material converts the scintillations into electrons which are absorbed and effectively ionize a thin layer of gas.

The novel features that I consider characteristic of my invention are set forth with particularity in the appended claims. My invention itself, however, both as to its organization and its method of operation, together with additional objects and advantages thereof, will best be understood from the following description of specific embodiments when read in connection with the accompanying drawing, in which:

Figure 1:
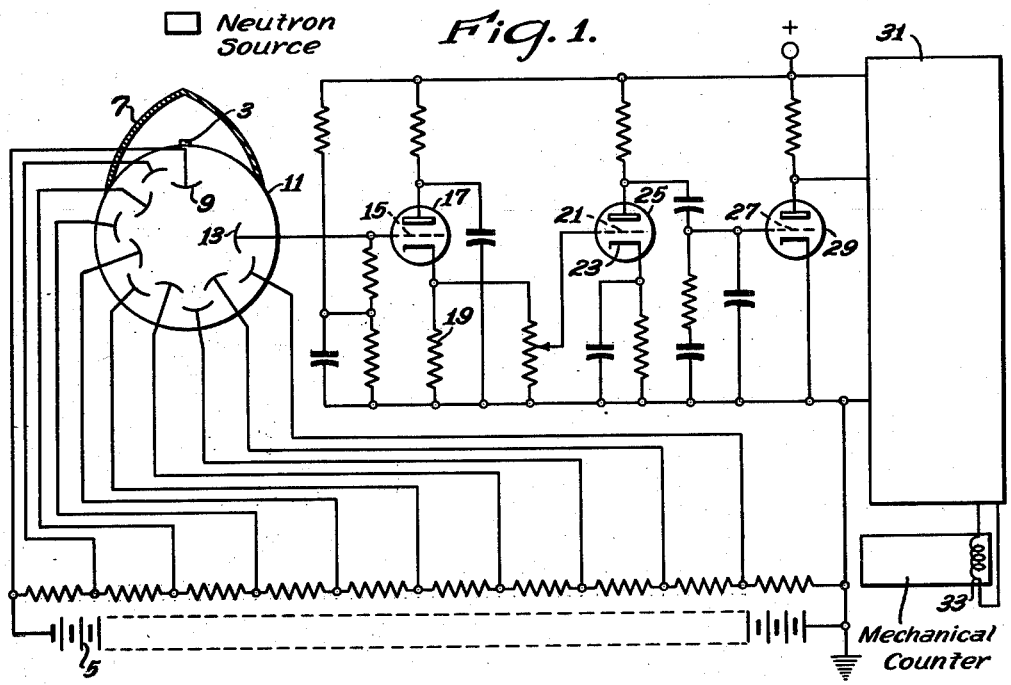
Figure 1 is a circuit diagram showing an embodiment of my invention.

The apparatus shown in Fig. 1 comprises a reactive fluorescent body 3 on which elementary particles of the neutron type are projected from a source 5 for example. A screen (not shown), such as lead slab, may be interposed between the source 5 and the body 3 to filter out particles of the proton type. The body 3 includes, either mixed or chemically compounded therewith, a phosphor (zinc sulphide, zinc cadmium sulphide, calcium tungstate) and an element, such as boron, which reacts with elementary particles of neutron type to produce elementary particles of the proton type. About the fluorescent body 3 a reflector 7 is disposed. When the elementary particles of the proton type are released in the body 3, scintillations are produced. The scintillations are gathered by the reflector 7 and projected on the collecting electrode 9 of a photomultiplier 11 (an RCA-931-A for example).

The optical device 7 for gathering the scintillations may be of any curved type. For example, it may be a reflector in the form of a zone of a paraboloid, or of a sphere or in the form of a section of a circular cylinder or paraboloid of revolution. Under certain circumstances, curved lenses may also be utilized. Any reference hereinafter to a reflector or optical device shall be taken to mean an optical system or component for light gathering purpose. The reflector 7 may be composed of any suitable sheet metal properly finished, such as aluminum or stainless steel sheet or chromium plated aluminum or steel sheet. Since neutrons transpass such sheet without appreciable loss in number, the reflector 7 need not be perforated to transmit the particles of the neutron type. The reflector 7 is thus highly efficient.

The fluorescent body 3 and the collecting electrode 9 of the photo-multiplier 11 are disposed at conjugate foci of the reflector 7. Scintillations produced at the body 7 are reflected to the collecting electrode and produce a substantial flow of electron current at its output electrode 13. The output electrode 13 is connected to the grid 15 of a tube 17 connected in a cathode follower circuit. The output impedance 19 of the cathode follower is connected between the grid 21 and cathode 23 of an amplifier 25 and the output terminal of the latter is coupled to the grid 27 of a second amplifier 29. The parameters of the cathode follower and amplifier circuits are such that the over-all amplifier system has a video pass band in excess of one megacycle (response curve is in excess of one megacycle wide 6 db from maximum).

The output of the video amplifier 17—25—29 is connected to a scaling circuit 31 of the type described in detail in the Coltman and Marshall application. The bias of the scaling circuit is so set that it does not respond to the dark current variations of the photo-multiplier, but does respond to the current pulses produced when the light from scintillations originating at the body 3 impinge on the photo-multiplier electrode 9. A counter 33 is operated from the scaling circuit 31. With a high ratio scaling circuit 31 elementary particles of the neutron type incident at rate as high as 100,000 to 1,000,000 for record may be detected.

Figure 2:
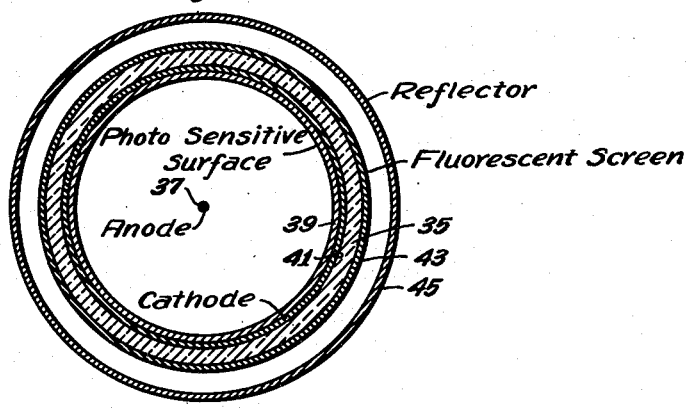
Fig. 2 is a view in section of a "Geiger" counter in accordance with my invention.

The "Geiger" counter shown in Fig. 2 comprises a hollow vacuumtight cylinder 35 of glass within which an ionizable gas at a low pressure is disposed. Coaxial with the cylinder 35, a conducting rod 37 which serves as an anode is provided. On the inner surface of the glass cylinder 35, a thin composite layer is provided. The outer face 41 of the composite layer just under the glass 35 is composed of a thin transparent conducting material and serves as a cathode. The inner face 39 of the composite layer is composed of a photo-sensitive compound such as caesium antimonide ($SbCs_3$). The inner face 39 of the composite layer emits electrons when light impinges thereon. Around the outer surface of the glass cylinder 35 there is a fluorescent screen 43 which reacts with elementary particles of the neutron or proton type. This screen may be composed of zinc sulfide alone. For particles of the proton type, it need not be neutron reactive. For detecting particles of the neutron type a screen composed of a mixture of zinc sulphide (ZnS) and boric acid ($H_3BO_3$) in equal proportions by weight may be used. The thickness of the fluorescent screen 43 should be of the order of one to five millimeters. The fluorescent screen 43 is encircled by a cylindrical reflecting cylinder 45 of sheet metal, such as aluminum or chromium-plated steel, for example. The reflector may be perforated in one region in counters according to my invention, for detecting elementary particles of the proton type.

Elementary particles of the neutron type penetrate the reflector 45 and impinge on the reactive fluorescent screen 43. In the screen, they release elementary particles of the proton type which, in turn, produce scintillations. The direct light from the scintillations and the light from the scintillations repeatedly reflected from the cylindrical reflector 45 impinge on the photo-sensitive surface 39. The latter emits electrons which ionize the gas. A high potential (source not shown) is impressed between the outer face of the composite layer 41 and the anode 37, and when the gas is ionized, current flows between the composite layer 39, 41 and the anode, indicating that a particle of the neutron type has impinged on the fluorescent screen 43.

The "Geiger" counter, in accordance with my invention, is shown as a circularly cylindrical structure. My invention may be practiced with structures of other types such as are available in the tube art. For example, the electrodes 37 and 41, fluorescent screen 43 and reflector 45 may have the flattened elliptic form commonly used in vacuum tubes. The cathode and the photosensitive surface may also be interchanged although in such a modified "Geiger" counter the electrons would have to pass through the cathode into the gas and would lose energy. Within the broader aspects of my invention also falls a "Geiger" counter in which the cathode and photosensitive element are one.

Although I have shown and described a certain specific embodiment of my invention, I am fully aware that many modifications thereof are possible. My invention, therefore, is not to be restricted except as insofar as necessitated by the prior art and by the spirit of the appended claims.

I claim as my invention:

1. A detector for elementary particles of the neutron type comprising a detecting material sensitive to said elementary particles of the neutron type and capable of emitting elementary particles of the proton type, a phosphor capable of emitting light when said elementary particles of the proton type are incident thereon as a result thereof, means producing a substantial dark current for amplifying the pulse of energy emitted by said phosphor, and a discriminator connected to the output of said means for amplifying for suppressing pulses under a predetermined amplitude.

2. A detector for elementary particles of the neutron type comprising a detecting material sensitive to said elementary particles of the neutron type and capable of emitting elementary particles of the proton type, a phosphor capable of emitting light when said elementary particles of the proton type are incident thereon as a result thereof, said detecting material and said phosphor being substantially non-responsive to light, means producing a substantial dark current for amplifying the pulse of energy emitted by said phosphor, and a discriminator connected to the output of said means for amplifying for suppressing pulses under a predetermined amplitude.

KUAN-HAN SUN.

REFERENCES CITED

The following references are of record in the file of this patent:

UNITED STATES PATENTS

| Number | Name | Date |
| --- | --- | --- |
| 2,030,440 | Fritze et al. | Feb. 11, 1936 |
| 2,220,509 | Brons | Nov. 5, 1940 |
| 2,272,375 | Kallmann et al. | Feb. 10, 1942 |
| 2,288,717 | Kallmann et al. | July 7, 1942 |
| 2,288,718 | Kallmann et al. | July 7, 1942 |
| 2,344,042 | Kallmann et al. | Mar. 14, 1944 |
| 2,351,028 | Fearon | June 13, 1944 |
| 2,401,288 | Morgan et al. | May 28, 1946 |

OTHER REFERENCES

Curran et al.: Atomic Energy Commission Document, MDDC, 1296, Nov. 17, 1944, 4 pp.